(12) United States Patent
Ben-Itzhak

(10) Patent No.: US 7,614,085 B2
(45) Date of Patent: Nov. 3, 2009

(54) METHOD FOR THE AUTOMATIC SETTING AND UPDATING OF A SECURITY POLICY

(75) Inventor: Yuval Ben-Itzhak, Kiron (IL)

(73) Assignee: Protegrity Corporation, Georgetown, Grand Cayman (KY)

( * ) Notice: Subject to any disclaimer, the term of this patent is extended or adjusted under 35 U.S.C. 154(b) by 507 days.

(21) Appl. No.: 10/433,532

(22) PCT Filed: May 1, 2003

(86) PCT No.: PCT/IL03/00352

§ 371 (c)(1),
(2), (4) Date: Nov. 20, 2003

(87) PCT Pub. No.: WO03/096168

PCT Pub. Date: Nov. 20, 2003

(65) Prior Publication Data

US 2005/0038881 A1       Feb. 17, 2005

(30) Foreign Application Priority Data

May 9, 2002      (IL) ..................................... 149583

(51) Int. Cl.
*H04L 29/14*      (2006.01)
(52) U.S. Cl. .............................. 726/25; 726/1; 726/11; 726/23; 726/24
(58) Field of Classification Search .................. None
See application file for complete search history.

(56) References Cited

U.S. PATENT DOCUMENTS 4,734,853 A      3/1988   Nakano (Continued)

FOREIGN PATENT DOCUMENTS

EP        1 160 643 A2     12/2001

(Continued)

OTHER PUBLICATIONS

Andress, "Network scanner pinpoint problems", Network World, Jun. 2002, Retrieved from the Internet on Jun. 15, 2007: <URL: http://www.networkworld.com/reviews/2002/0204bgrev.html>.*

(Continued)

*Primary Examiner*—Minh Dinh
(74) *Attorney, Agent, or Firm*—Paul, Hastings, Janofsky & Walker LLP

(57) ABSTRACT

The invention relates to a method for creating and/or updating a security policy within a computerized system protected by at least one security package, comprising: (a) Providing at least one trusted source within the system, capable of issuing a report detailing the structure and/or attributes of the system and/or security flaws within the system; (b) Periodically operating said at least one trusted source in order to periodically issue said report; (c) Importing each trusted source report into a security correcting unit, and forming one consolidated file containing the details from all said reports; (d) Importing into said security correcting unit the attributes files of all the security packages; (e) Separately comparing the content of said consolidated file with each of the imported attributes files, and updating each attributes file with the security information included within said consolidated file, information which is missing from the said attributes file, and is relevant to said attributes file; and (f) Separately exporting said updated attributes files and effecting each of them as the active attributes file of the corresponding security package, thereby effecting an updated security policy.

15 Claims, 18 Drawing Sheets

U.S. PATENT DOCUMENTS

| | | | |
|---|---|---|---|
| 5,073,933 | A | 12/1991 | Rosenthal |
| 5,166,977 | A | 11/1992 | Ross |
| 5,191,611 | A | 3/1993 | Lang |
| 5,220,604 | A | 6/1993 | Gasser et al. |
| 5,224,163 | A | 6/1993 | Gasser et al. |
| 5,315,657 | A | 5/1994 | Abadi et al. |
| 5,317,742 | A | 5/1994 | Bapat |
| 5,347,578 | A | 9/1994 | Duxbury |
| 5,559,800 | A | 9/1996 | Mousseau et al. |
| 5,566,326 | A | 10/1996 | Hirsch et al. |
| 5,594,227 | A | 1/1997 | Deo |
| 5,611,048 | A | 3/1997 | Jacobs et al. |
| 5,623,600 | A | 4/1997 | Ji et al. |
| 5,623,601 | A | 4/1997 | Vu |
| 5,629,981 | A | 5/1997 | Nerlikar |
| 5,657,390 | A | 8/1997 | Elgamal et al. |
| 5,724,355 | A | 3/1998 | Bruno et al. |
| 5,774,695 | A | 6/1998 | Autrey et al. |
| 5,778,189 | A | 7/1998 | Kimura et al. |
| 5,826,014 | A | 10/1998 | Coley et al. |
| 5,870,544 | A | 2/1999 | Curtis |
| 5,889,953 | A | 3/1999 | Thebaut et al. ........ 295/200.51 |
| 5,892,900 | A | 4/1999 | Ginter et al. |
| 5,908,469 | A | 6/1999 | Botz et al. |
| 5,910,987 | A | 6/1999 | Ginter et al. |
| 5,917,912 | A | 6/1999 | Ginter et al. |
| 5,933,498 | A | 8/1999 | Schneck et al. |
| 5,941,947 | A | 8/1999 | Brown et al. |
| 5,944,794 | A | 8/1999 | Okamoto et al. |
| 5,949,876 | A | 9/1999 | Ginter et al. |
| 5,968,176 | A | 10/1999 | Nessett et al. ................ 713/201 |
| 5,974,549 | A | 10/1999 | Golan |
| 5,982,891 | A | 11/1999 | Ginter et al. |
| 5,983,270 | A | 11/1999 | Abraham et al. |
| 6,035,423 | A * | 3/2000 | Hodges et al. ................ 714/38 |
| 6,092,194 | A | 7/2000 | Touboul |
| 6,105,027 | A | 8/2000 | Schneider et al. |
| 6,154,844 | A | 11/2000 | Touboul et al. |
| 6,158,010 | A | 12/2000 | Moriconi et al. ............ 713/201 |
| 6,199,181 | B1 | 3/2001 | Rechef et al. |
| 6,226,372 | B1 * | 5/2001 | Beebe et al. ................ 379/189 |
| 6,298,445 | B1 | 10/2001 | Shostack et al. ............ 713/201 |
| 6,311,278 | B1 | 10/2001 | Raanan et al. |
| 6,317,868 | B1 | 11/2001 | Grimm et al. |
| 6,321,337 | B1 | 11/2001 | Reshef et al. |
| 6,356,906 | B1 | 3/2002 | Lippert et al. |
| 6,477,651 | B1 | 11/2002 | Teal |
| 6,584,569 | B2 * | 6/2003 | Reshef et al. ................ 726/25 |
| 6,668,282 | B1 | 12/2003 | Booth, III et al. |
| 6,684,329 | B1 | 1/2004 | Epstein et al. |
| 6,782,418 | B1 | 8/2004 | Cerrone et al. |
| 6,785,821 | B1 | 8/2004 | Teal |
| 6,792,461 | B1 | 9/2004 | Hericourt |
| 6,842,758 | B1 | 1/2005 | Bogrett |
| 6,895,383 | B2 * | 5/2005 | Heinrich ........................ 705/7 |
| 6,944,678 | B2 | 9/2005 | Lu et al. |
| 6,952,779 | B1 * | 10/2005 | Cohen et al. ................... 726/22 |
| 6,970,943 | B1 | 11/2005 | Subramanian et al. |
| 6,988,209 | B1 | 1/2006 | Balasubramaniam et al. |
| 6,996,845 | B1 | 2/2006 | Hurst et al. |
| 7,000,247 | B2 * | 2/2006 | Banzhof ........................ 726/2 |
| 7,152,240 | B1 * | 12/2006 | Green et al. ................... 726/4 |
| 7,162,742 | B1 * | 1/2007 | Flowers et al. ................ 726/25 |
| 2001/0034847 | A1 | 10/2001 | Gaul, Jr. |
| 2002/0133590 | A1 | 9/2002 | McBrearty et al. |
| 2002/0169986 | A1 | 11/2002 | Lortz |
| 2003/0056116 | A1 * | 3/2003 | Bunker et al. ................ 713/201 |
| 2003/0131256 | A1 * | 7/2003 | Ackroyd ..................... 713/201 |
| 2003/0135749 | A1 * | 7/2003 | Gales et al. ................. 713/200 |
| 2003/0233581 | A1 | 12/2003 | Reshef et al. |
| 2004/0010709 | A1 * | 1/2004 | Baudoin et al. ............. 713/201 |
| 2004/0123141 | A1 | 6/2004 | Yadav |
| 2005/0005112 | A1 | 1/2005 | Someren |
| 2006/0137014 | A1 | 6/2006 | Hurst et al. |

FOREIGN PATENT DOCUMENTS

| | | |
|---|---|---|
| EP | 1 160 645 A2 | 12/2001 |
| WO | WO 99/56196 A1 | 11/1999 |
| WO | 0016200 | 3/2000 |
| WO | 0016206 | 3/2000 |
| WO | 02075547 | 9/2002 |
| WO | PCT/IL03/00352 | 7/2004 |

OTHER PUBLICATIONS

"Security Assessment Methodology", Network Magazine India, Dec. 2001, Retrieved from the Internet on Jun. 15, 2007: <URL: http://www.networkmagazineindia.com/200112/cover2.htm>.*

U.S. Appl. No. 60/345,689, filed Date: Dec. 31, 2001.*

Symantec Corporation: "E-security begins with sound security policies," Announcement Symantec, Jun. 14, 2001.

Ceponkus A et al: "XML as an information exhange format between clients and servers," Applied XML: a Toolkit for Programmers, 1999.

Bertino E et al: "On Specifying Security Policies for Web Documents With an XML-Based Language" 2001.

BRP Publications, "App Shield Provides Block Against Application Hacks", Report on Electronic Commerce, vol. 6, issue 16, Sep. 7, 1999.

Ghosh et al., "Detecting Anomalous and Unknown Intrusions Against Programs", Computer Security Applications Conference, 1998. Proceedings. 14th Annual, Phoenix, AZ, USA Dec. 7-11, 1998, Los Alamitos, CA, USA, IEEE Comput. Soc. US, Dec. 7, 1998, pp. 259-267, XP010318640.

Javitz et al., "The SRI IDES Statistical Anomaly Detector", Proceedings of the Symposium on Research in Security and Privacy, Oakland, May 20-22, 1991, Los Alamitos, IEEE Comp. Soc. Press, US, vol. Symp. 12, May 20, 1991, pp. 316-326, XP 010024232.

Messmer, "New Tool Blocks Wily E-Comm Hacker Tricks", CNN.com Sep. 7, 1999.

Scott et al., "Abstracting Application-Level Web Security", May 2002, WWW2002, pp. 396-407.

Toshiba, "MAGNIA2000Ri/Anti-Hacker User's Guide", A2 Edition, K.K. Toshiba Digital Media Network Inc., Feb. 28, 2001.

* cited by examiner

```
<z:row Date='2002-01-14T12:52:13' Url='http://10.0.0.2/demo'
    Domain='myserver' c7='10.0.0.2' Port='80' c10='Server: Microsoft-IIS/5.0'
ProtocolName='http:' Path='/demo' Action='faq.asp'
CookieName='ASPSESSIONIDGQQQQBWC' CookieValue
='CLKFPBFBFJDKIFPONFIMIAJJ'/>

<z:row Date='2002-01-14T12:52:13' Url='http://10.0.0.2/demo'
    Domain='myserver' c7='10.0.0.2' Port='80' c10='Server: Microsoft-IIS/5.0'
ProtocolName='http:' Path='/Authentication' Action=' Login.asp"
CookieName='ASPSESSIONIDGQQQQBWC' CookieValue
='CLKFPBFBFJDKIFPONFIMIAJJ'/>
```

Fig. 9a

```xml
<Network_Tunnel>
        <Name>Demo</Name>
        <Protocol>TCPIP</Protocol>
        <ListenAddress>10.0.0.15</ListenAddress>
        <ListenPort>80</ListenPort>
        <ConnectLocalAddress>10.0.0.15</ConnectLocalAddress>
        <ConnectAddress>10.0.0.2</ConnectAddress>
        <ConnectPort>80</ConnectPort>
        <ConnectTimeOut>5000</ConnectTimeOut>
</Network_Tunnel>
<Application_Tunnel>
        <Name>App</Name>
        <Protocol>HTTPS</Protocol>
        <Version>1.0</Version>
        <Application_Paths>
                <ApplicationPath>/test</ApplicationPath>
                <ApplicationPath>/samples</ApplicationPath>
                <ApplicationPath>/demo</ApplicationPath>
                <ApplicationPath>/cgi-bin</ApplicationPath>
        </Application_Paths>
-</Application_Tunnel>
```

Fig. 9b

```
< Record>
<Network attributes   isNew=False >
<Protocols>
        <Protocol isNew= True>
                <Name> TCPIP</Name>
                <Version></Version>
                <IP> 10.0.0.2</IP>
                <Port> 80</Port>
                <Host> myserver</Host>
                <Domain></Domain>
                <ID>1</ID>
                <[Any]></[Any]>
        </Protocol>
</Protocols>
</Network attributes>

<Application attributes   isNew = False >
<Protocols>
        <Protocol isNew=True>
                <Name>HTTP</Name>
                <Version>1.0</Version>
                <Domain>myserver</Domain>
                <ID>1</ID>
                <[Any]></[Any]>
        </Protocol>
<Protocols>
</Application attributes>

<Application Paths  isNew=True >
        <Virtual Paths isNew=True>
                <Virtual Path ID=1, Related_Protocol=1>/demo</Virtual Path>
                <Virtual Path ID=2, Related_Protocol=1>/ Authentication </Virtual Path>

</Virtual Paths>
        <Physical Paths isNew=False>
                < Physical Path ID=, Related_Protocol=></ Physical Path>
        </ Physical Paths>
</Application Paths>
```

Fig. 10a

```
<Application Actions isNew=True >
<Actions>
    <Action isNew=True>
        <Name>Login.asp</Name>
        <Method>GET</Method>
        <Direction>1</Direction>
        <Location isNew=Ture>
            <Related Path ID></Related Path ID>
        </Location>
        <ID>1</ID>
    </Action>
    <Action isNew=True>
        <Name>faq.asp</Name>
        <Method>GET</Method>
        <Direction>1</Direction>
        <Location isNew=Ture>
            <Related Path ID></Related Path ID>
        </Location>
        <ID>2</ID>
    </Action>
</Actions>
<Operations>
    <Operation isNew= >
        <Name>
        <Actions>
            <Action isNew= ></Action>
        </Actions>
        <ID></ID>
    <Operation>
</Operations>
</Application Actions>
        <Action attributes isNew= True>
            <Action restricts order= >
                <Action ID>1</Action ID>
                <Parameter Name>ASPSESSIONIDGQQQQ6WC</Parameter Name>
                <Parameter Value>CLKFPSFBFJDKIFPONFIMIAJJ</Parameter Value>
                <Parameter Type></Parameter Type>
                <Parameter Structure></Parameter Structure >
                <Parameter Direction><Parameter Direction>
                <Embedded Action ID></ Embedded Action ID>
                <[Any]></[Any]>
            </Action>
        </Action attributes>
```

Fig. 10a

```
                              <Action Flow isNew=True>
    <Action ID=1>
        <Post Actions>
            <Action>2</Action>
        <Post Actions>
    </Action>
    <Action ID=2>
        <Pre Actions>
            <Action>1</Action>
        <Pre Actions>
    </Action>
</Action Flow>
</Record>
```

Fig. 10a

```
< Record>
< Network attributes  isNew= >  these attributes define the network layer protocols
<Protocols>
        <Protocol isNew=>
                <Name></Name>
                <Version></Version>
                <IP></IP>
                <Port></Port>
                <Host></Host>
                <Domain></Domain>
                <ID></ID>
                <[Any]></[Any]>
        </Protocol>
</Protocols>
</Network attributes>

<Application attributes  isNew = >  these attributes define the application layer protocols
<Protocols>
        <Protocol isNew=>
                <Name></Name>
                <Version></Version>
                <Domain></Domain>
                <ID></ID>
                <[Any]></[Any]>
        </Protocol>
<Protocols>
</Application attributes>

<Application Paths  isNew= >  these attributes define the application's API location
        <Virtual Paths isNew=>
                <Virtual Path ID=, Related_Protocol=></Virtual Path>
        </Virtual Paths>
        <Physical Paths isNew=>
                < Physical Path ID=, Related_Protocol=></ Physical Path>
        </ Physical Paths>
</Application Paths>
```

Fig. 10b

```
<Application Actions isNew= >  these attributes define the application's supported API
<Actions>
        <Action isNew= >  these attributes define the application's supported API messages
                <Name></Name>
                <Method></Method>
                <Direction></Direction>
                <Location isNew= >
                        <Related Path ID></Related Path ID>
                </Location>
                <ID></ID>
        </Action>
</Actions>
<Operations>
        <Operation isNew= >
                <Name>
                <Actions>
                        <Action isNew= ></Action>
                </Actions>
                <ID></ID>
        <Operation>
<Operations>
</Application Actions>

<Action attributes isNew= >  these attributes define the application's supported API
messages interface
                <Action restricts order= >
                        <Action ID></Action ID>
                        <Parameter Name></Parameter Name>
                        <Parameter Value></Parameter Value>
                        <Parameter Type></Parameter Type>
                        <Parameter Structure></Parameter Structure >
                        <Parameter Direction><Parameter Direction>
                        <Embedded Action ID></ Embedded Action ID>
                        <[Any]></[Any]>
                </Action>
</Action attributes>

<Action Flow isNew= >  these attributes define the application's supported API messages flow order
        <Action ID= >
                <Pre Actions>
                        <Action></Action>
                <Pre Actions>
                <Post Actions>
                        <Action></Action>
                <Post Actions>
        </Action>
</Action Flow>

< /Record>
```

Fig. 10b

```
< Record>
<Network attributes  isNew=False >  these attributes define the network layer protocols
<Protocols>
        <Protocol isNew=False>
                <Name>TCPIP</Name>
                <Version></Version>
                <IP>10.0.0.15</IP>
                <Port>80</Port>
                <Host></Host>
                <Domain></Domain>
                <ID>1</ID>
                <[Any]></[Any]>
        </Protocol>
</Protocols>
</Network attributes>
<Application attributes  isNew = False >
<Protocols>
        <Protocol isNew=True>
                <Name>HTTPS</Name>
                <Version>1.0</Version>
                <Domain>myserver</Domain>
                <ID>1</ID>
                <[Any]></[Any]>
        </Protocol>
<Protocols>
</Application attributes>

<Application Paths  isNew=False >
        <Virtual Paths isNew=False>
                <Virtual Path ID=1, Related_Protocol=1>/test</Virtual Path>
                <Virtual Path ID=2, Related_Protocol=1>/samples</Virtual Path>
                <Virtual Path ID=3, Related_Protocol=1>/demo</Virtual Path>
                <Virtual Path ID=4, Related_Protocol=1>/cgi-bin</Virtual Path>
        </Virtual Paths>
        <Physical Paths isNew=False>
                < Physical Path ID=, Related_Protocol=></ Physical Path>
        </ Physical Paths>
</Application Paths>
</Record>
```

Fig. 11

```
< Record>
<Network attributes  isNew=False > these attributes define the network layer protocols
<Protocols>
        <Protocol isNew=False>
              <Name> TCPIP</Name>
              <Version></Version>
              <IP>10.0.0.2</IP>
              <Port>80</Port>
              <Host></Host>
              <Domain></Domain>
              <ID>1</ID>
              <[Any]></[Any]>
        </Protocol>
</Protocols>
</Network attributes>
<Application attributes  isNew = True >
<Protocols>
        <Protocol isNew=True>
              <Name>HTTP</Name>
              <Version>1.0</Version>
              <Domain>myserver</Domain>
              <ID>1</ID>
              <[Any]></[Any]>
        </Protocol>
<Protocols>
</Application attributes>
<Application Paths  isNew=True >
        <Virtual Paths isNew=True>
              <Virtual Path ID=3, Related_Protocol=1>/demo</Virtual Path>
        </Virtual Paths>
        <Physical Paths isNew=False>
              < Physical Path ID=, Related_Protocol=></ Physical Path>
        </ Physical Paths>
</Application Paths>
</Record>
```

Fig. 12

```
<Network_Tunnel>
        <Name>Demo</Name>
        <Protocol>TCPIP</Protocol>
        <ListenAddress>10.0.0.2</ListenAddress>
        <ListenPort>80</ListenPort>
        <ConnectLocalAddress>10.0.0.2</ConnectLocalAddress>
        <ConnectAddress>10.0.0.2</ConnectAddress>
        <ConnectPort>80</ConnectPort>
        <ConnectTimeOut>5000</ConnectTimeOut>
</Network_Tunnel>
<Application_Tunnel>
        <Name>App</Name>
        <Protocol>HTTP</Protocol>
        <Version>1.0</Version>
        <Application_Paths>
        <ApplicationPath>/demo</ApplicationPath>
    </Application_Paths>
</Application_Tunnel>
```

Fig. 13

METHOD FOR THE AUTOMATIC SETTING AND UPDATING OF A SECURITY POLICY

FIELD OF THE INVENTION

The present invention relates to the field of securing computer applications, networks and services. More particularly, the present invention relates to a method and system for simplifying the setting of a security policy, and dynamically amending the same upon introduction of changes having security effects within the application, network, or services which the application provides. In a most preferred embodiment of the invention, said first setting, and the amendments to the same, are carried out in an automatic manner. Alternatively, semi-automatic, or manual methods are also within the scope of the invention.

BACKGROUND OF THE INVENTION

Connectivity, functionality and security are conflicting objectives in the application environment of organizations. Typical modern implementation of computer applications allows users to execute a wide range of applications, and offers various services, in order to meet the needs of a modern organization. Unfortunately, the need for providing a wide range of application services to many users can render these services vulnerable to attack or misuse by external entities, such as hackers, or unauthorized entities.

Currently, securing computer applications and services involves the manual setting of a security policy, which is based on "best practice" guidelines, and prior knowledge of the applications, or services, and networks involved. Special security applications have been developed in order to provide the system manager with the ability to enforce the security policy, or to detect unauthorized flaws, use, or operations. Some security applications are network-oriented, with the intention of enforcing security within the network domain. Examples of such network-oriented security applications are: The "Firewall" by Checkpoint Inc., Symantec Inc. There have been also introduced application-oriented security packages, which are intended to enforce and ensure a security policy within the application domain. An example of such an application domain security packages is, InterDo by KaVaDo Inc. Normally, the applied security policy heavily depends on, and is affected by, the administrator's security skills and knowledge of the application, the network, the services and the entire environment.

Means, which hereinafter will be referred to as "security scanners", or more generally, "trusted sources", are also known in the art, and are used for checking whether the computerized environment complies with the security policy as set. Each of these scanners or trusted sources is generally compatible with one security package. The scanners test and challenge the domain which is protected by the security application, and provides a report regarding the flaws found and the identified attributes. Thereafter, it remains to the administrator to translate the report, and to correct whatever is needed. The correction of the reported flaws and identified attributes heavily depends on the skills of the system administrator. More particularly, the correction many times requires programming-oriented skills, which the average system administrator lacks.

Another aspect of this problem is the fact that computerized environments are very dynamic. New users are introduced to the environment, others eliminated, new applications or hardware introduced or removed, and most importantly, the applications themselves are in many cases dynamically amended or changed by programmers or users within the environment. The system administrator often does not have full control over all these rapidly occurring changes, many of them being reported afterwards, if at all. As a result of the above-described situation, current security policies are rather statically enforced, and the applications and the environments remain vulnerable.

It is an object of the present invention to provide a system and method for constantly or periodically checking the compliance of the application and its environment to the security policy enforced, to detect and verify incompatible security flaws and attributes, and to automatically or semi-automatically correct and eliminate said flaws.

It is another object of the present invention to associate said system and method with the security applications operating within the computerized environment.

It is still another object of the present invention to provide means for dynamically checking and correcting each specific security policy which is enforced by any of the security applications operating within the computerized environment.

It is still another object of the present invention to provide said tasks in a simple and efficient manner.

It is still another object of the invention to provide means which can effectively receive indications and reports of flaws from security scanners or other trusted sources, and to correct the same in an automatic or semi-automatic manner.

Other objects and advantages of the invention will become apparent as the description proceeds.

SUMMARY OF THE INVENTION

The present invention relates to a method for the updating of a security policy within a computerized system protected by at least one security package, which comprises the steps of: a. providing at least one trusted source within the system, capable of issuing a security report detailing the structure of the system or security flaws within the system; b. periodically operating said at least one trusted source in order to periodically issue said report; c. importing each trusted source report into a security correcting unit, and forming one consolidated file containing the details from all said reports; d. importing into said security correcting unit the attributes files of all the security packages; e. separately comparing the content of said consolidated file with each of the imported attributes files, and updating each attributes file with the security information included within said consolidated file, information which is missing from the said attributes file, and is relevant to said attributes file; and f. separately exporting said updated attributes files and effecting each of them as the active attributes file of the corresponding security package, thereby effecting an updated security policy.

Preferably, the method further comprises the steps of: a. the step of importing each trusted source report further comprises the step of transforming each report into a common format, and forming said consolidated file in said common format; b. the step of importing into said security correcting unit the attributes files of all the security packages further comprises the step of transforming each attributes file into said common format; and c. the step of separately exporting each of said updated attributes files and effecting the same as the active attributes file of the corresponding security package further comprises the step of transforming said attributes file from a common format into a package specific format, prior to said exporting.

Preferably, said updating is made by further using a predefined set of logical rules, for deciding which update to effect and which to ignore.

Preferably, each of said reports comprises at least one attribute component.

Preferably, each of said issued reports is arranged in the corresponding trusted source specific format.

Preferably, each of said attributes files is arranged in the corresponding package specific format.

Preferably, each security package effects a security policy within its predefined range of responsibility, according to the content of its attributes file.

In an embodiment of the invention, one or more of the trusted sources may be security scanners.

In one embodiment of the invention, some or all of the steps involved in the updating are carried out in a semi-automatic manner, requiring the operator's approval.

In an embodiment of the invention, some of the trusted sources may be human beings, issuing a manual report.

In one embodiment of the invention, some of the attribute components included in the reports are attributes intended to eliminate known flaw cases, and some of the attribute components are attributes intended to eliminate unpredicted cases.

Preferably, the attributes in the reports intended to eliminate unexpected cases are attributes relating to the current structure of the system, which when recorded within an updated attributes files enforce a security policy bounded to said structure, rejecting activity deviated from said structure.

The present invention further relates to a system for updating a security policy, which comprises: a. at least one security package enforcing a. security policy within a predefined range of responsibility, said policy being defined by means of a specific attributes file associated with each of said packages; b. at least one trusted source capable of issuing a security report detailing the structure of the system or security flaws within the system; c. a security correcting unit for: 1. importing said reports from all the trusted sources, and producing a consolidated file including information from all said reports; and 2. importing the attributes files from all the security packages, separately comparing the content of said consolidated file with each of the imported attributes files, and updating each attributes file with the security information included within said consolidated file, which is missing from the said attributes file, and is relevant to said attributes file, and exporting said updated attributes files and effecting each of them as the active attributes file of the corresponding security package, thereby effecting an updated security policy.

Preferably, the security correcting unit comprises: a. at least one first importing modules for importing reports from each trusted source; b. a consolidation module for receiving each of said reports and forming one consolidated file containing information included in all said reports; c. at least one second importing modules for importing into the correcting unit from each security package its corresponding attributes file; d. a security policy creation module for comparing the content of said consolidated file with each of the imported attributes files, and updating each attributes file with the security information included within said consolidated file, information which is missing from the said attributes file, and is relevant to said attributes file; and e. at least one exporting module for exporting each updated attributes file into its corresponding security package, thereby effecting an updated security policy.

In an embodiment of the invention, the system further comprises at least one first transform modules for transforming each report from its trusted source specific format into a common format, at least one second transform modules for transforming each imported attributes security package from its package specific format into a common format, and at least one third transform modules for transforming each updated attributes file from a common format into its package specific format before its exportation into the corresponding package, and wherein the consolidated file is also arranged in said common format.

In an embodiment of the invention the security policy creation module may further comprise a set of predefined logical decision rules, for use while updating the attributes files.

In still another embodiment of the invention, one of the security packages is an Intrusion Detection System or Intrusion Prevention Systems, whose set of signatures being stored within a file, said file being treated as an attributes file of a security package, and is therefore updated accordingly.

In still another embodiment of the invention, one of the security packages is an application switch, whose set of attributes that is used for direction being stored within a file, said file being treated by the system as an attributes file of a security package, and is therefore updated accordingly.

BRIEF DESCRIPTION OF THE DRAWINGS

In the drawings:

FIG. 9a shows an example for a report including two attribute components as obtained from one trusted source, such as a security application scanner;

FIG. 9b shows an example for a package (for example, "firewall gateway") specific attributes file forming a security policy of that package;

FIG. 10a shows an example for a consolidated file while being empty, before consolidation;

FIG. 10b shows the consolidated file, after transformation of the report of FIG. 9a into a common format and consolidation with the skeleton of the consolidated file;

FIG. 11 shows the temporary attributes file in common format;

FIG. 12 shows the temporary attributes file of FIG. 11, after being updated with information from the consolidated file; and FIG. 13 shows the final, updated, package specific attributes file, as amended by the system of the invention; more particularly, this attributes file of FIG. 13 is essentially the corresponding temporary attributes file, as amended by information from the consolidated file of FIG. 10b, and contains an updated policy.

DETAILED DESCRIPTION OF PREFERRED EMBODIMENTS

Figure 1:
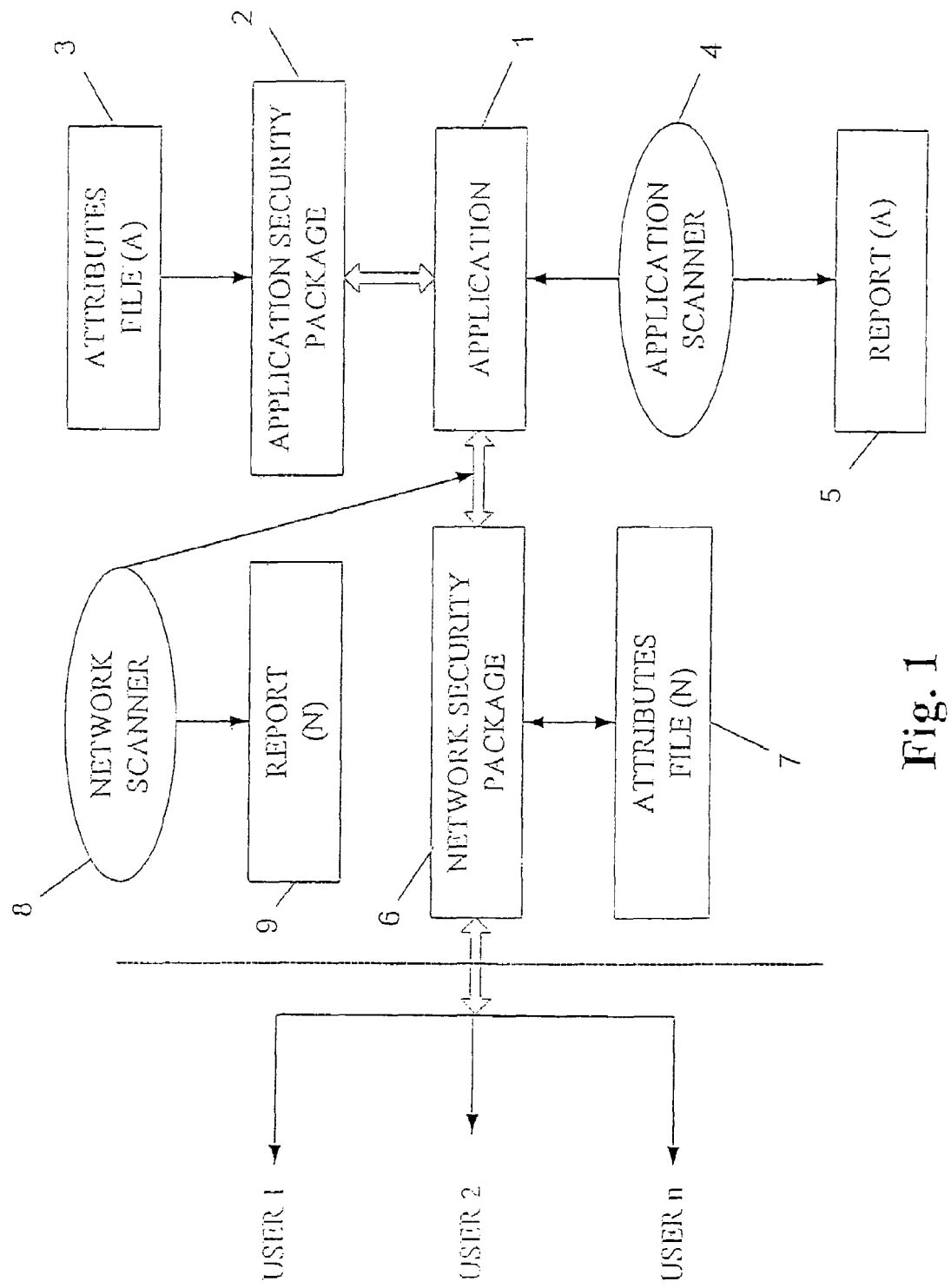
FIG. 1 shows a typical security system for securing a computerized environment, according to the prior art.

FIG. 1 shows a typical security system for securing an application environment providing services to a plurality of users, according to the prior art. The application 1 provides services to a plurality of users $USER_1$-$USER_n$. The rights for properly activating the application, and more particularly, the activity within the network is secured by a network security package 6. The network security package may be, for example, a "Firewall" package, such as the one distributed, for example, by Checkpoint Inc. The rights for activating specific characteristics within the application itself, for example, for receiving specific services, is secured by an application security package 2, such as, the "InterDo" distributed by KaVaDo Inc. More applications, security packages and users may exist in the secured environments but these have not been indicated in this figure for the sake of brevity. Generally, each security package enforces and supervises a security policy, as defined by a system administrator within the range (application, network, or both) of its defined responsibility. The security policy of each package comprises a set of distinct constraints, expressed by means of attributes that are generally saved in an attributes file dedicated to that package. In FIG. 1, the attributes file of the application security package is indicated by numeral 3, and the attributes file of the network security package is indicated by numeral 7. Furthermore, there have been developed programs for checking security flaws within the application or the network. Such programs are generally called scanners, and in this application they will be referred to as "security scanners". The security scanners, that may be provided by the same manufacturer of the specific package, are generally each specific to each package, and their purpose is to test the network, the application, or both, whichever is the range of the responsibility of the package, and to provide a report to the system manager containing attributes regarding the detected flaws which have to be properly dealt with. The scanners generally operate by means of challenging various aspects of the network and/or the application. The system manager, having this report, generally has to introduce amendments to the corresponding attributes file. This is usually a complicated procedure, which requires the performance of tasks which are in many cases beyond the skills of the average system manager. Moreover, the vulnerability of the system, which is dynamic, and may change any moment, depends on the frequency of performing the scanner tests by the system manager, and these cannot be performed in high repetition rate.

Figure 2:
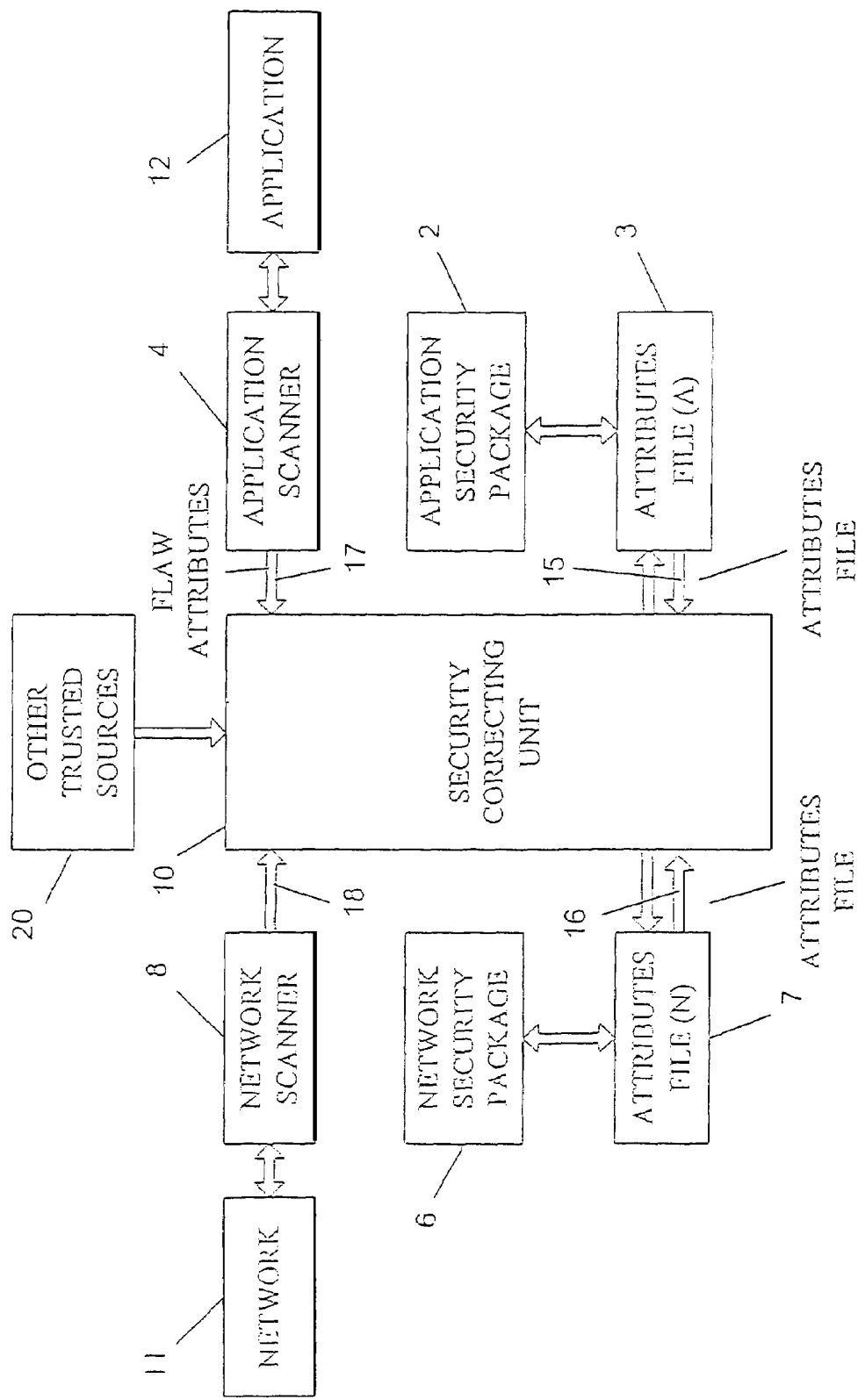
FIG. 2 illustrates the structure of the improved security system, according to one embodiment of the invention.

FIG. 2 illustrates the structure of the improved security system, according to one embodiment of the invention. According to the present invention, a security correcting unit 10 is provided. The security application and network scanners 4 and 8 perform their operation as before. The content of each of the reports is also imported into the security correcting unit 10. The security correcting unit also imports (15, 16) each of the existing attributes files. The security correcting unit analyses the flaw attributes (17, 18) as received from the application and/or the network scanners, compares the same with each of the existing attributes files 3 and 7 correspondingly, issues amendments to the attributes, wherever needed, and outputs either new, corrected attribute files, or only amendments to the existing attribute files 3 and 7. The updated attribute files include the corrections needed to eliminate the detected flaws. It should be further noted that flaw reports to the security correcting unit may also be provided, in addition to the scanners reports, from other trusted sources 20, i.e., sources that are considered as capable of providing reliable flaw and attribute reports. Moreover, although in the most preferable embodiment of the invention the operation of the improved system is performed in a full automatic manner, in some embodiments the operation may be semi-automatic, manual, or a combination thereof.

As is known and common in the art, each attributes file has its specific structure and deals with specific attributes. Hereinafter, it will be shown how the security correcting unit 10 overcomes this drawback, in order to be able to provide updates to the various attributes files.

Figure 3:
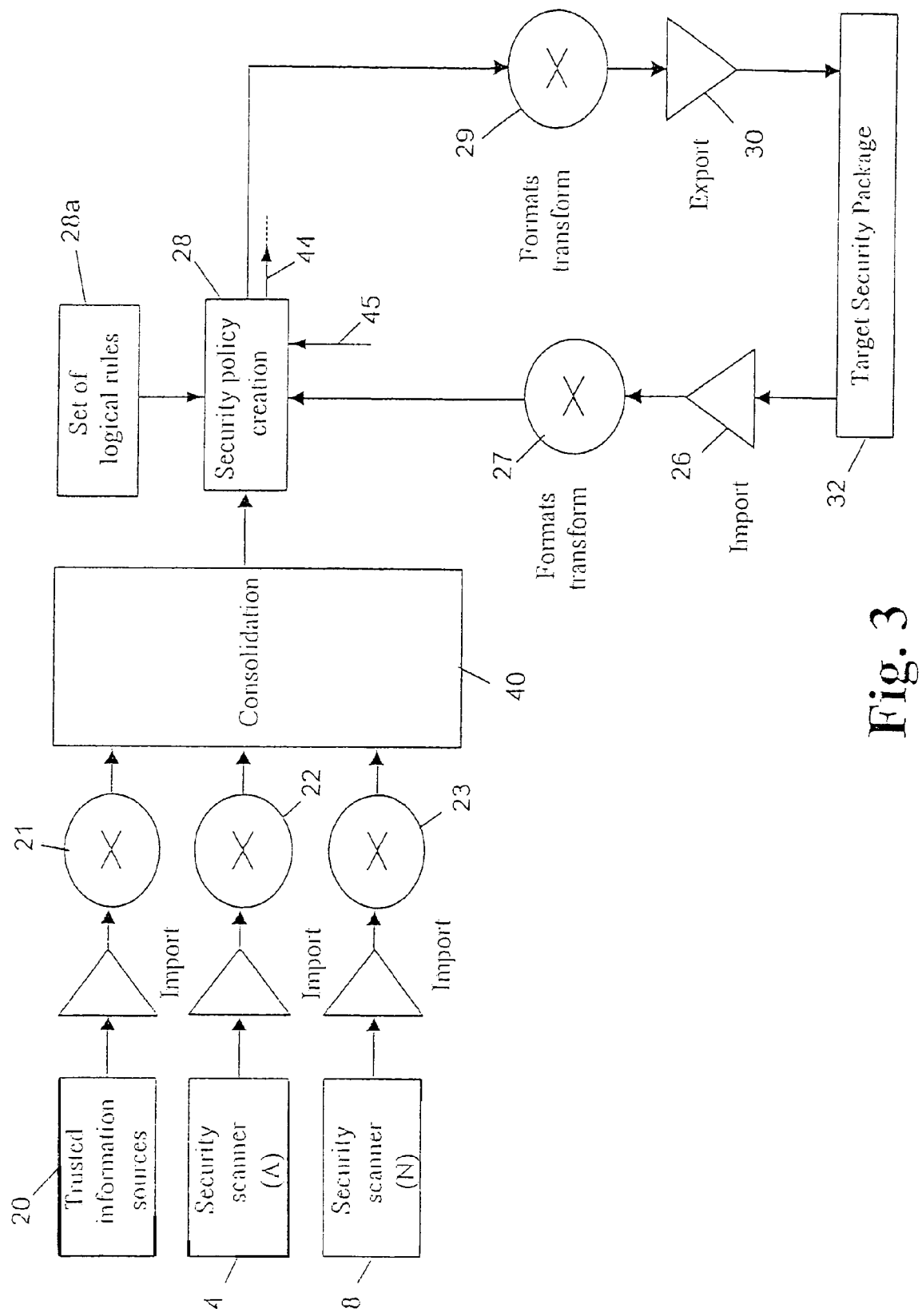
FIG. 3 is a block diagram illustrating in more detail the operation of the security correcting unit, according to one embodiment of the invention.

FIG. 3 is a block diagram illustrating in more detail the operation of the security correcting unit 10. The security correcting unit imports flaw attributes reports particularly from the network and application scanners 4 and 8, but also it may receive reports or partial flaw indications from the other trusted sources 20. The reports also may contain information regarding the current general structure of the checked system, such as a tree map of the system. As each of the reports generally comes in its package specific format, and the formats differ one from the other, each of the specific flow reports is transformed by transform stages 21, 22, and 23 respectively into a same, common format specific to the correcting unit 10. The flaw outputs from the transform stages 23, 24, and 25, being in a said common format, are conveyed into a consolidation unit 40, which consolidates all the flaw reports into one file, in said common format. The security correcting unit further imports from the security packages their attributes files. In FIG. 3 only one of target package 32 is shown for the sake of brevity, however, as is clear to those skilled in the art, the correcting unit may correct and in fact corrects in the same manner illustrated herein the security policies of a plurality of security packages, for example network security package 6, and application security package 2. The security correcting unit imports the attributes file 3 or 7 from the corresponding security package, and then transforms it by unit 27 into said common format. The resulting transformed attributes files, being in said common format, are conveyed separately into the security policy creation module 28. Then, the security policy creation module 28, which as said receives flaw reports from a plurality of sources (including the security scanners), and current attributes files from the security packages, creates one large attributes file in said common format. The said one large attributes file contains all the attributes summed from all the plurality of imported attributes files (reflecting the current security policy), plus all the flaws attributes received from the trusted sources, including the security scanners, reflecting flaw attributes which have to be added in order to eliminate flaws. More particularly, the large common file created by the security policy creation module 28 reflects all the constraints that should be enforced by all the security packages existing in the system. Then, the transform unit 29 transforms for each security package the said large common file into the format specific for each package. Of course, this transformation involves elimination of some constraints existing in the large common file that are irrelevant for the specific attributes file of the target package 32. For example, the large common file may include network attributes that are irrelevant for the attributes file of the application security package, and these are eliminated during the transform procedure 29. In another example, the application specific attributes that are irrelevant to the network security package are eliminated, when carrying the format transform 29 for the network security package 6. The file created after the transform 29, being an updated attributes file, is then exported and saved as the attributes file of the corresponding security package. Preferably, the "old", previous attributes file is first saved, and then replaced by the updated file, in order to enable returning, if the updated file is found to be defective or less preferable.

It should be noted that in one embodiment of the invention, the operation of the security policy creation module 28 may be governed by, or associated with a set of logical rules, defining how the module acts when it faces some specific cases. For example, the set of logical rules may govern whether a specific attribute, when reported by a trusted source, will be applied and effect a new, updated policy, or not. Existing of such a set of logical rules is within the scope of the invention, and it is marked as 28a in FIG. 3.

Any security system may operate in one of the two approaches, positive, negative, or a combination thereof:

a. Negative Approach: A set of "negative" attributes relating to any type of action or access that should not be allowed within the application is defined and saved within the attributes file. All requested actions or accesses within the application are verified continuously by the security system against said set of attributes. If a requested action (or access) is found to meet one of the attributes within the set, it is related as illegal, and denied. An example for a security system operating in the negative approach is an anti-virus system. A disadvantage of this approach is the requirement of the security system to be continuously updated by situations as learned from other trusted sources (that previously faced such illegal situations, for example a virus), or for the system manager to predict future, possible illegal actions (before they occur!), and to add attributes to the set accordingly.

b. Positive Approach: All legal actions or accesses that are allowed within the application are defined by the system manager, and a corresponding "positive" attributes set is saved within the attributes file. Any action or access that does not meet a saved attribute within the saved set is considered as illegal, and therefore denied. An advantage of this approach is that the system manager does not have to predict any future illegal situation, as any such situation (that does not meet an attribute within the set) is considered as illegal by default. This system is therefore safer. A disadvantage of this approach, however, is that essentially legal situations may be denied due to not being reflected in advance by an attribute within the saved attributes set. This approach is therefore not preferable for systems that are modified frequently.

The present invention may operate with security systems that apply one of said negative or positive approaches, or with, systems that combine said two approaches. Throughout this application the attributes files therefore may contain attributes relating to any of said negative or positive approaches or a combination thereof.

Following are some examples for attributes types that may be provided from the trusted sources, and may be included within the common file created.

1. Network attributes—For example, network Protocol names and version, Ports)—Common sources: network security scanners, routers, firewall packages, switches, network sniffers etc.
  2. Application attributes—For example, application protocol names and version, domains, application methods. Common sources: Firewall packages, network security scanners, application security scanners, web servers intrusion detection systems. etc.
  3. Application paths attributes—For example, page locations, virtual directory names, etc. Common sources: Application scanners, web servers, intrusion detection systems, etc.
  4. Application actions attributes—For example, supported methods (e.g. GET, SET, DELETE, POST), directions, parameters, etc. Common sources: Application scanners, Web servers, Web application, databases, XML Schemas describing the action attributed data structure.
  5. Action Flow attributes—For example, sequence of actions, business flow and logic. Common sources: Application scanners, Web application, database It should be noted that the system of the invention may face two types of situations, as follows:

A. Known (Expected) Issues
  1. Detected and/or verified vulnerabilities within the application, for which the trusted source (such as a scanner) does not have the capability of providing a solution.
  2. Detected and/or verified vulnerabilities for which the trusted source has the capability of suggesting a solution.

B. Unknown (Unpredictable) Issues

Application details—The system of the present invention may face vulnerable situations which may not be known or expected during its operation. In order to provide security for such unknown situations, and to eliminate such future vulnerabilities, an additional security approach is needed. The approach applied by the present invention is the restriction of the "valid" operation to only some which meet predefined attributes, such as action flow, paths, attributes (e.g. action="login.cgi", paths="/demo", attributes="username, password"); Any access to the application by attributes which are not included in said redefined attributes is prohibited (e.g. action="test.cgi", paths="/sample", attributes="debug"). Using this approach, future vulnerabilities will be eliminated if they fail to satisfy these predefined attributes (e.g. if the user requests for the action "register.cgi" and this action is NOT valid, this action will be denied as it is not included in, the valid actions list).

The system of the present invention will therefore use the consolidated file in order to provide an updated security policy which includes solutions not only to known issues, but also to unknown future vulnerabilities. The solutions are provided on-line in an automatic or semi-automatic manner.

Figure 4:
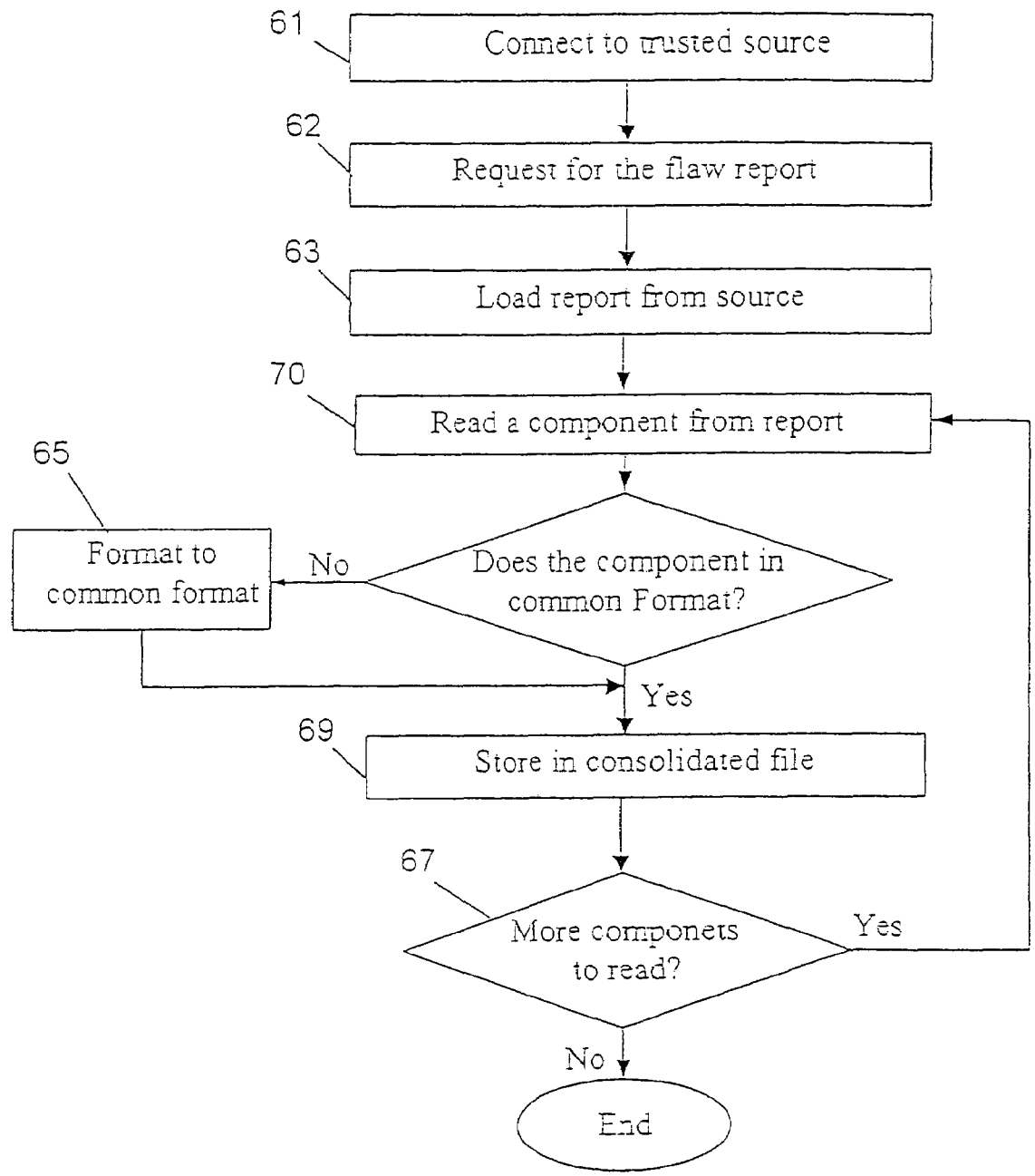
FIG. 4 illustrates the procedure of importing by the security correcting unit the flaw attributes report.

FIG. 4 illustrates the procedure of importing by the security correcting unit 10 the flaw attributes report which is essentially a file including components of attributes, from a trusted source, for example, an application security scanner 4, and formatting the same to a common format, according to one embodiment of the invention. It should be noted herein that one "attribute" may span several lines within a file. Hereinafter, the group of lines within a file that relates to one attribute will be referred to as an "attribute component". In step 61, the correcting unit connects to a selected data source. In step 62, the correcting unit requests the report from the trusted source. Next, in step 63, the correcting unit loads the report from the scanner 4. In step 70, the unit reads a first attribute component from the loaded report. In step 64, the unit checks whether the component is in the common format. It should be noted that step 64 may be relevant only if the common format is predefined to be the same as the format of one of the trusted sources. In the case that the common format is defined to be different from any of the formats of all the trusted information reports, step 64 is superfluous, and the procedure automatically continues to the formatting step 65. If in step 64 it is found that the component is not in the common format, the component is transformed in step 65 to the common format, and in step 69 it is stored in the consolidated file. Next, in step 67 the unit checks whether there are more components to read. In the affirmative case, the procedure returns to step 63, and repeats until finally transforming all the report components. The procedure ends (step 69) when all the report components are read and transformed. At the end of this procedure, a consolidated file is formed.

The procedure of FIG. 4 repeats for all the relevant trusted sources, while operating to add to a same consolidated file.

Figure 5:
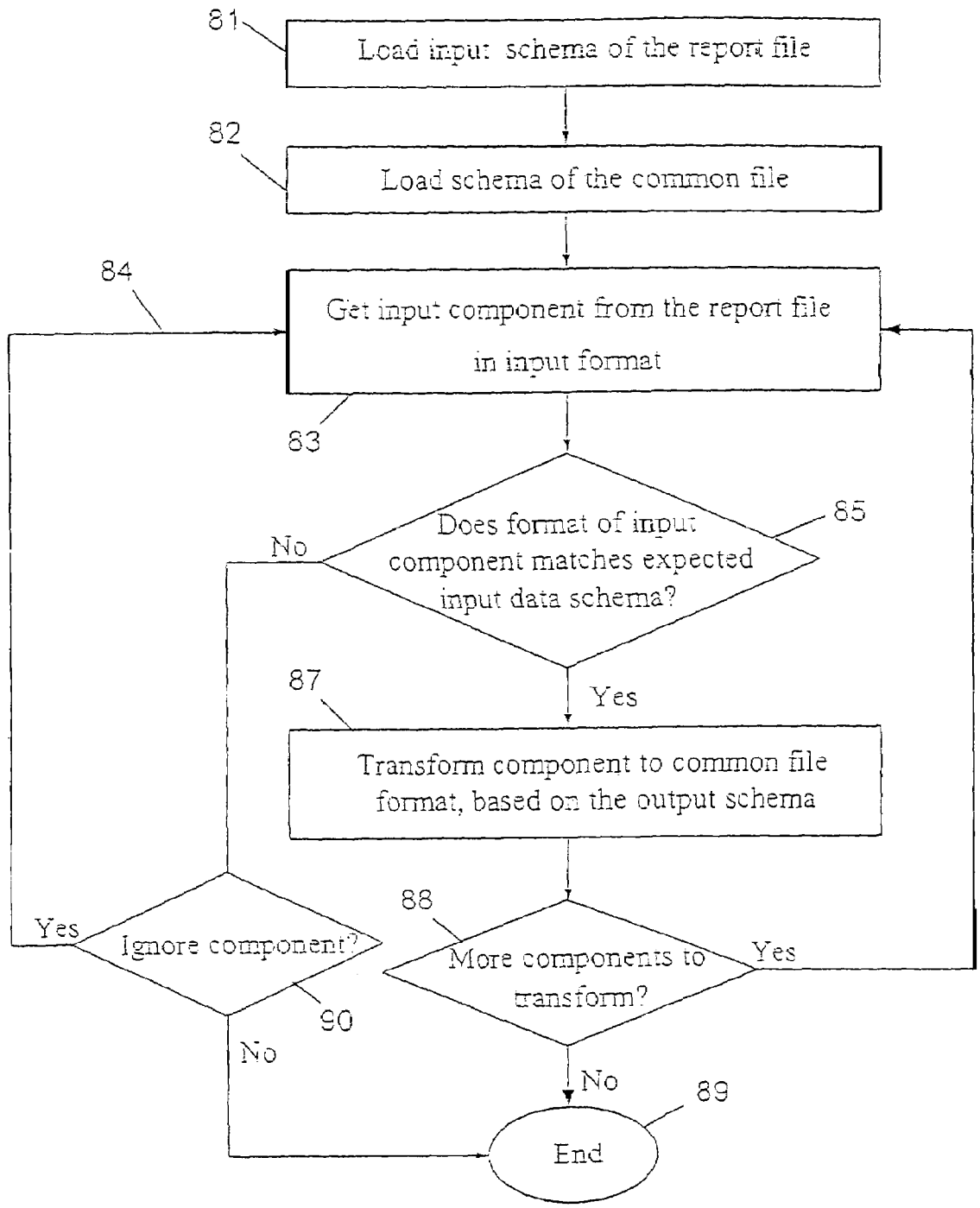
FIG. 5 illustrates the operation of one transformation step of the correcting unit.

FIG. 5 illustrates the operation of the transformation step 65 of FIG. 4, as performed by a transform stage 21, 22, or 23 (FIG. 3), whichever is active. In step 81, the stage 65 loads the schema of the input report file, to make it be available. The term "schema" relates herein to data describing the structure or pattern by which data in a file is organized. In step 82 the stage 65 loads the schema of the common attributes file. The two schemas are necessary for the stage 65 in order to determine the meaning of the data it reads from the attributes file, and to transform the read data according to the schema of the common file. In step 83, the stage inputs (arrow 84) one attribute component from the report file, of course in the format of the report file (the input format). It then checks whether the format of the input component matches the format of the input schema of the report file. If not, that means that the transformation is impossible. In that case, in step 90 the procedure decides whether to terminate the process (step 90) and ignore the entire report file from that source, or to ignore only that inputted component and return to step 83 to retrieve the next component from the report file. In step 87, assuming transformation is possible, the component is transformed according to the schema of the common output file, and saved as an attribute component within the common (consolidated) file. In step 88 the stage checks whether there are more components to transform. If positive, the procedure returns to step 84. If this is the last attribute component, the procedure terminates (step 89). In one embodiment of the invention as described, the procedure of FIG. 5 repeats on all the report files of the various trusted sources, adding each performance to a same consolidated file. The product of the several performances of the transformation procedures of FIG. 5 (stages 21, 22, or 23 of FIG. 3) is the common (consolidated) file.

In another embodiment of the invention, each performance of the procedure of FIG. 5 creates one temporary transformed file. Therefore, at the end of the several performances of that procedure, the procedure of FIG. 6 follows.

Figure 6:
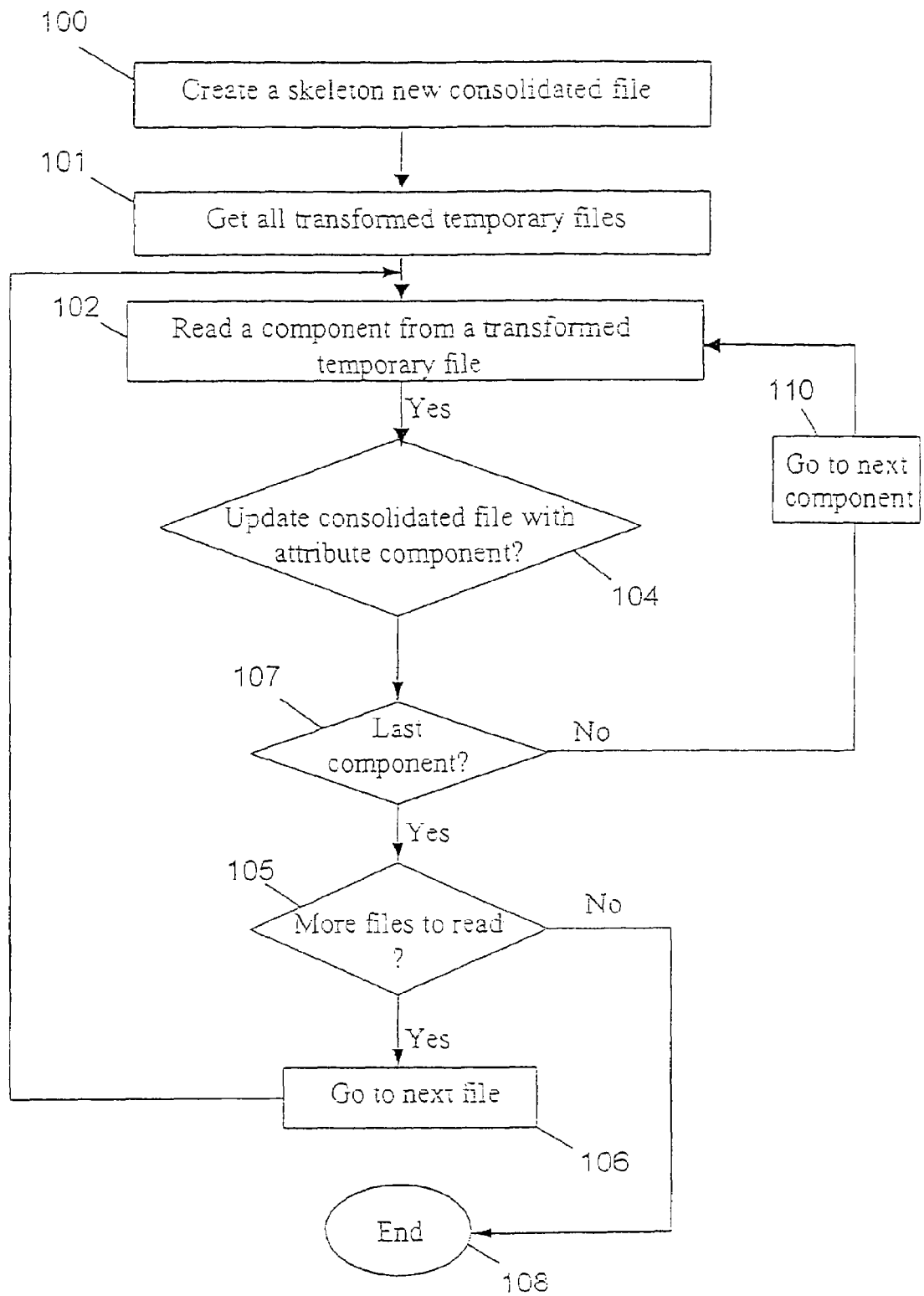
FIG. 6 illustrates a portion of the process of producing the consolidated file.

In step 100 of FIG. 6, the process creates a skeleton of the new consolidated file. More particularly, this skeleton file is essentially an empty table, to which attributes from the plurality of temporary files are filled. In step 101 the process gets, or assures the availability of the plurality of the temporary transformed files as created by the procedure of FIG. 5. In step 102, the procedure begins by reading a first component from the first temporary file and updating the consolidated file by filling corresponding empty attribute spaces within the skeleton consolidated file (step 104). In step 107, the procedure checks whether this was the last component in the temporary file. If not, the procedure proceeds to the next component (step 110), and returns to step 102. If, however, in step 107 it is found that the last component has been reached, the procedure checks in step 105 whether there are more temporary files to process. If no, the procedure terminates. If, however, there are still unprocessed files, the procedure proceeds to step 106, in which it refers to the next file, and returns to step 102. As said, the product of the procedure of FIG. 6 is a consolidated file.

Figure 7:
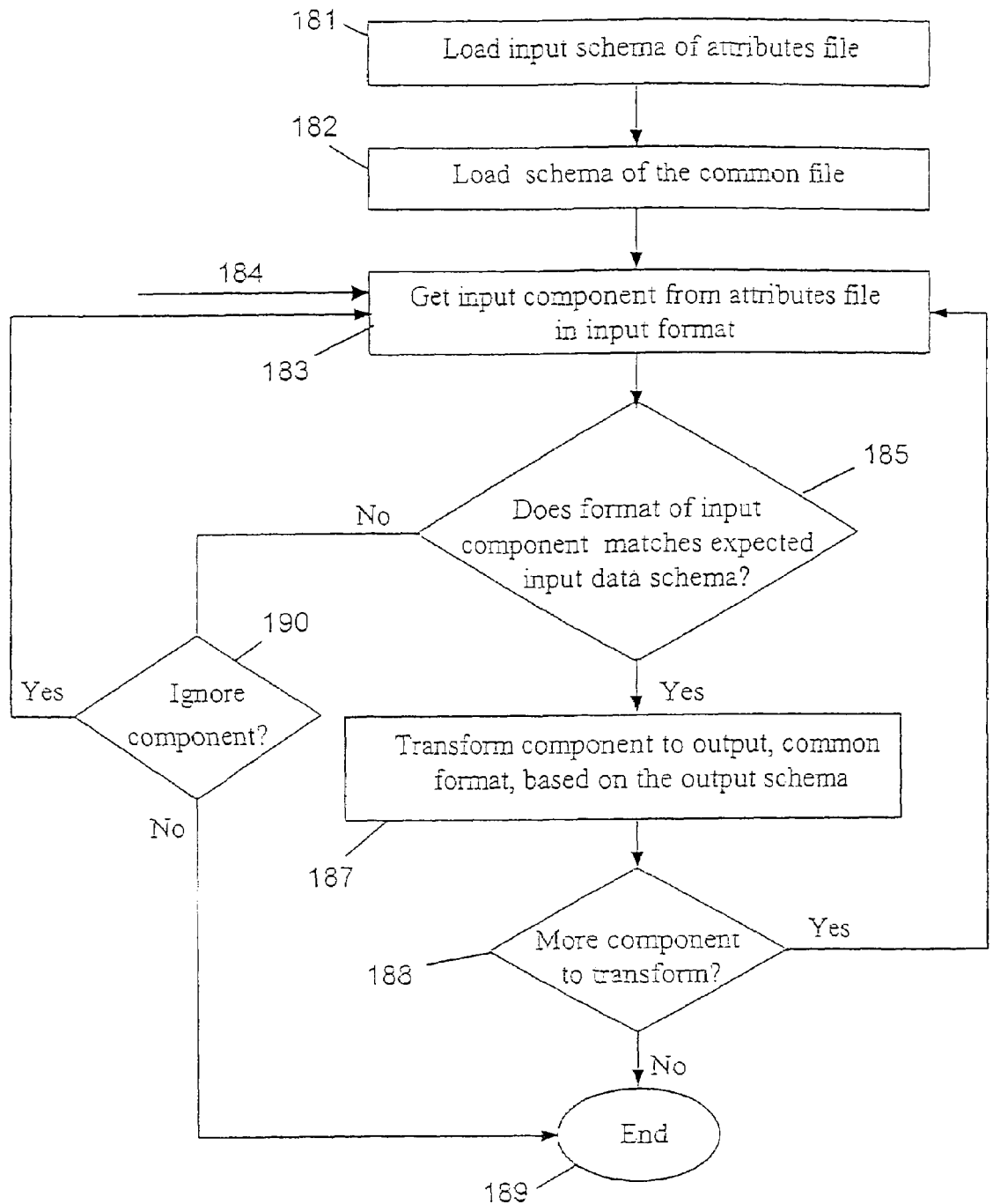
FIG. 7 describes how the attributes files are imported from the trusted sources and transformed to corresponding temporary attributes files in the common format.

FIG. 7 describes how the attributes files are imported from the trusted sources and transformed to corresponding temporary attributes files in said common format. In step 181 the procedure loads the schema of the relevant attributes file, i.e., the input schema. In step 182 the procedure loads the schema of the common file. The two schemas are necessary for the procedure to determine the meaning of the data it reads from the attributes file, and allow it transform the read data according to the schema of the common file. In step 184, the procedure inputs a component from the relevant attributes file (in the input format). In step 183, the procedure inputs (arrow 184) one attribute component from the attributes file, of course in the format of the attributes file (the input format). It then checks whether the format of the input component matches the format of the input schema of the attributes file. If not, that means that the transformation is impossible. In that case, in step 190 the procedure decides whether to terminate the process (step 189) and eliminate the possibility of correcting that attributes file, or to ignore only that inputted component and return to step 183 to retrieve the next component from the attributes file. In step 187, assuming transformation is possible, the component is transformed according to the schema of the common output file, and saved as an attribute component within the corresponding temporary attributes file (in said common format). In step 188, the procedure checks whether there are more components to transform. If positive, the procedure returns to step 184 for retrieving one more component from the attributes file. If, however, this is the last attribute component, the procedure terminates (step 189). The procedure of FIG. 7 is performed a plurality of times, once for each of the attributes files of the security packages. At the end of said plurality of performances, there are available to the system a plurality of corresponding temporary attributes files, all in said common format Each of said temporary attributes files is essentially a file reflecting the current security policy enforced by the corresponding package, however represented in said common format.

Next, having the consolidated file on the one hand, and the plurality of the temporary, transformed attributes files on the other hand, all being formatted in same, common format, the security policy creation file begins substituting in each of said temporary attributes files corrections, or updates as included within the said consolidated file. Of course, said corrections are essentially correcting attributes as accumulated by the trusted sources, and included in their various reports. The procedure begins with updating the first temporary attributes file.

Preferably, the attributes are organized within the consolidated file, within the separate attributes files, and within the temporary attributes files in sections according to the attributes types. For example, the file may include the following sections: Network attributes, Application attributes, Application paths, etc. The procedure therefore goes to the first section of the consolidated file, for example, Network attributes retrieves the first component within the section, then it goes to the corresponding section within the temporary attributes file to compare whether the same attribute component exists within the temporary attributes file. If it finds that a same attribute component exists within the temporary attributes file, then no update is needed. If, however, the comparison shows that the retrieved component does not exist within the temporary attributes file, it adds the same to that file, within said relevant section (while operating in the automatic mode). It should be noted that in a semi-automatic mode of operation, a decision whether to update an attribute component within a temporary attributes file, may be brought to the operator's attention. Next, the procedure is repeated over all the attribute components within the consolidated file, until finishing amendment of the first temporary attributes file. In that respect, it should be mentioned herein that the consolidated file may include attribute components that are irrelevant in one or more temporary attributes files. For example, a network oriented attribute may not be relevant within an attributes file of an application security package. Moreover, there may be cases that a full attribute-type section may be missing from an attribute file. On the other hand, there may be cases in which an attribute component is found to be relevant in two or more separate temporary attribute files. Both of said cases are valid, according to the present invention.

Figure 8:
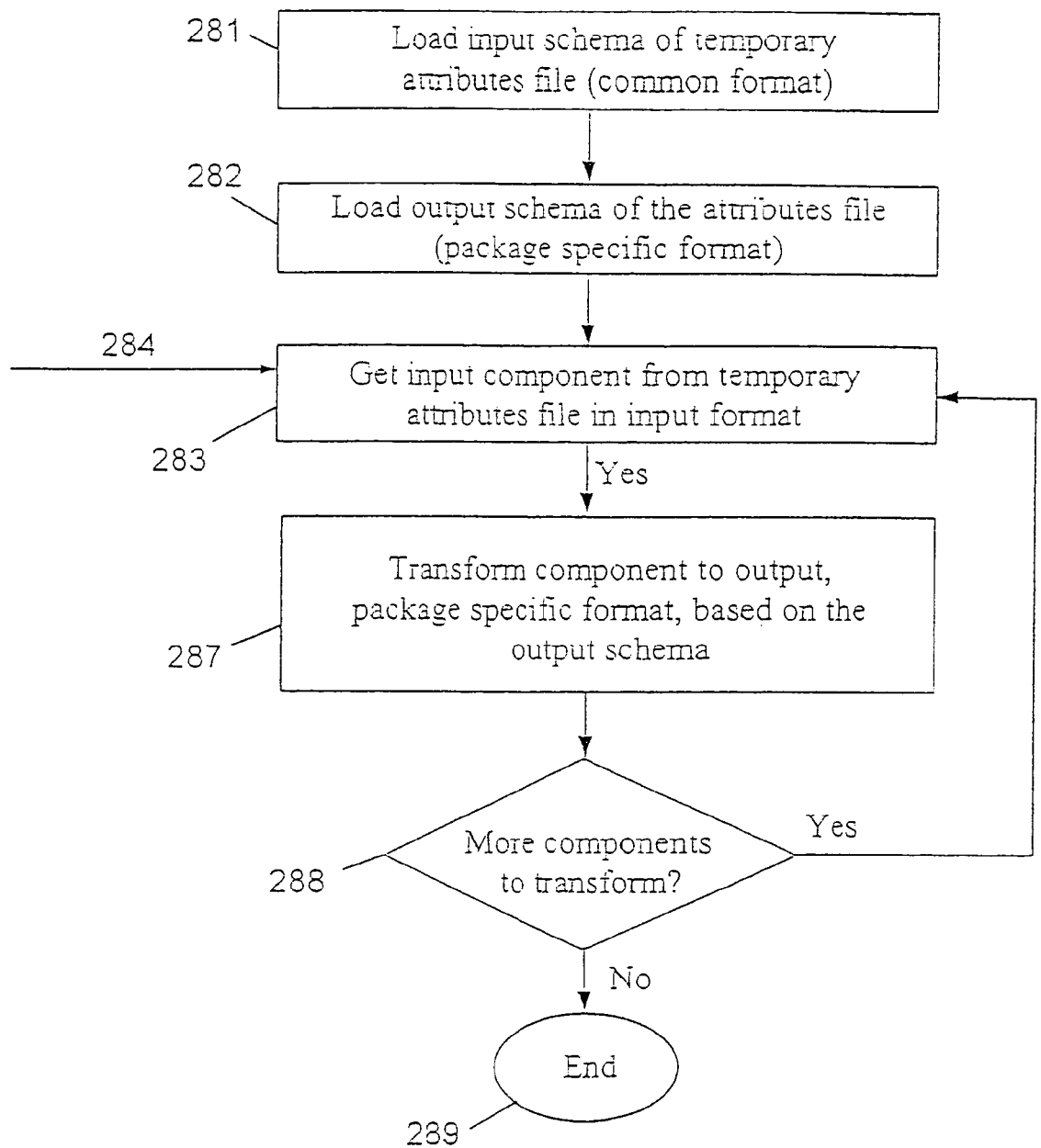
FIG. 8 describes how the back-transform from the common format into the package specific format is performed.

The same updating procedure as described above is repeated for all the temporary attributes files. Then, a back-transform procedure is performed, in order to transform each of said temporary attributes files (being each in the common format) into the corresponding, each security package specific format. The said back-transform is performed in a similar manner as the above described transforms. FIG. 8 describes how said back-transform is performed. In step 281 the procedure loads the schema of the relevant temporary attributes file, i.e., common format. In step 282 the procedure loads the output schema of the relevant attributes file, i.e., in package specific format. The two schemas are necessary for the procedure to determine the meaning of the data it reads from the attributes file, and allow transformation of the read data according to the schema of the common file. In step 284, the procedure inputs a first component from the relevant temporary attributes file (in the input format). In step 283, the procedure inputs (arrow 284) one attribute component from the temporary attributes file, of course in the format of the temporary attributes file (the common format). In step 287, the component is transformed according to the schema of the output, package specific format, and saved as an attribute component within the corresponding attributes file (in said package specific format). In step 288, the procedure checks whether there are more components to transform. If positive, the procedure returns to step 284 for retrieving one more component from the temporary attributes file. If, however, this is the last attribute component, the procedure terminates (step 289). The procedure of FIG. 8 is performed a plurality of times, once for each of the temporary attributes files. At the end of said plurality of performances, there are available to the system a plurality of corresponding attributes files, one for each security package, in its package specific format. Each of said attributes files contains an updated security policy for its corresponding security package. The files are exported each to its destination security package. Before replacement, the operator may be asked to confirm replacement of the attributes file.

As said above, a security system may face two types of cases, which it should handle, as follows:
 a. Handling the "known" cases, i.e., cases which can be predicted.
 b. Handling the "unknown" cases, i.e., future cases that cannot be predicted.

The reports from trusted sources, such as scanners, generally are intended to provide solutions to both of said two cases. An example for the first case is a report listing one or more paths to locations, access to which is possible in the system, although defined as prohibited. A detailed example to such a report and the manner by which such a flaw is eliminated by the system of the invention is given below.

Reports from trusted sources which intend to provide means for facing the second ("unknown") cases are also generally provided. Such a report may include a "map" of the application (or network), i.e., a tree indicating all the application locations, and their related paths. In other words, such a tree may indicate, for example, all the HTML pages within the application and the manner of accessing them (the related paths). According to an embodiment of the present invention, these paths, when included within said "second type report" are defined by the correcting unit as the only valid locations or paths. When such a report is received at the correcting unit of the invention, its content is conveyed (after carrying out the process as described above, including the transformations) into the relevant attribute file/s. That means that if somebody will try to access locations within the application (or network), or try to use a path that is not specifically defined as valid, his access will be denied. This type is called "unknown" as it is hard to predict the almost indefinite possibilities that a user may try to illegally access the locations within the application (and network), and a good security system should face and handle also these "facing the unknown" cases.

EXAMPLE 1

FIG. 9a shows an example for two attribute components as obtained from one trusted source, such as a security application scanner. More particularly, this is the scanner attributes report.

FIG. 9b shows an example for a package (for example, "a Gateway") specific attributes file forming a security policy of that package. As is seen, this file contains at its bottom four allowed application paths, as follows:

<ApplicationPath>/test</ApplicationPath>
<AppliccztionPath>/samples</ApplicationPath>
<ApplicationPath>/demo</ApplicationPath>
<ApplicationPath>/cgi-bin</ApplicationPath>

FIG. 10a shows the consolidated file while empty, before consolidation. As shown, this file is essentially a skeleton file, which includes fields to be filled with values.

FIG. 10b shows the consolidated file, after transformation of the report of FIG. 9a into the common format and consolidation with the skeleton of the consolidated file. As is seen, most of the consolidated file remains empty, as the report of FIG. 9a contains only two components which are shown in FIG. 10 at the application section, and as only one trusted source is used in this example.

FIG. 11 shows the temporary attributes file in common format. More particularly, it is the transformation of the attributes file of FIG. 9b, as transformed into the common format.

FIG. 12 shows the temporary attributes file of FIG. 11, after being updated with information from the consolidated file.

FIG. 13 shows the final, updated, package specific attributes file, as amended by the system of the invention. More particularly, this attributes file of FIG. 13 is essentially the corresponding temporary attributes file, as amended by information from the consolidated file of FIG. 10, and contains an updated policy. As is seen, the following Application-Path Attributes which were originally included in the attributes file (of FIG. 9b) were removed:

<ApplicationPath>/test</ApplicationPath>
<ApplicationPath>/samples</ApplicationPath>
<ApplicationPath>/cgi-bin</ApplicationPath>

The only attributes which remains due to the process of this example is:

```
<ApplicationPath>/demo</ApplicationPath>
```

More particularly, while originally users were permitted entry into four path locations, now entry into three of them is prohibited due to the flaw attributes report from the scanner.

It should be noted that the transformations of the report files into a common format, and back into each package specific format is needed due to the fact that in many cases the various security packages and trusted sources (such as scanners) use different file structures and formats, as they are in many cases manufactured by different entities. The transformation enables the performance of the necessary processing in one common format. However, there may be cases in which all the said files are given or structured in one, common format. In such cases, the transformation modules and the corresponding transformation operations may be found to be superfluous, and the system may be structured and operated without them.

It should be further noted that the system of the invention may also be used not only for updating a security policy, but for creating a security policy. This creation option may be used when one or more package attributes files are empty before the operation of the system, and the updates essentially create a new security policy for that package.

EXAMPLE 2

The following example illustrates a real-life scenario, in which the present invention is very advantageous. Imagine the following environment:

An independent, private network segment, is connected to the Internet, a public network.

Applications running within the private network are now accessible to users of the Internet. As these users are considered untrusted users, the private network uses several security packages to eliminate unauthorized or potentially damaging use of the applications by these users.

Security Packages in Use:

The security packages within the private network include devices and computer programs that inspect the incoming and outgoing packets and stream of bytes in order to provide the needed security. For example, the private environment utilizes the following security packages:

Network layer Firewall—to handle network layer security issues (provided by CheckPoint, Symantec etc.)

Application Layer Firewall—to handle application layer security issues (provided by KaVaDo, Entercept etc.)

Authentication server—to authenticate remote users based on specific attributes like UserName & Password (provided by Netegrity, RSA, CheckPoint)

Network scanner—to assess vulnerabilities within the network layers and to identify and/or verify network layer attributes (e.g. protocol type, version, etc.)

Application scanner—to assess vulnerabilities within the application layers and to identify and/or verify application layer attributes (e.g. protocol, parameters, actions, etc.)

Given the above environment description, the private network system administrator would like to check, verify and update the Application Layer Firewall policy in an automatic manner.

Based on the present invention, the administrator has several trusted sources which can be utilized:

Network layer Firewall—provides network layer security attributes;

Authentication server database—provides authorized user attributes (e.g. username & password);

Network scanner vulnerabilities and attributes reports—provide network layer security attributes (e.g. protocol name, version, etc.) and known vulnerabilities;

Application scanner vulnerabilities and attributes reports—provide application layer security attributes (e.g. allowable actions, action flow, action attributes, etc.)

The applications databases—provide the application's parameter names and values.

According to the present invention, the administrator may use the existing security policy from the Application Layer Firewall security server.

By applying the consolidated trusted sources data on the Application Layer Firewall security policy as reflected by its attributes file, by a manner as described in this application, a new or updated security policy is automatically created and can be exported to the Application Layer Firewall security server for use in automatic, semi-automatic or manual manners.

EXAMPLE 3

Intrusion Detection Systems (IDS) are network type security systems known in the art. Such systems are sometimes also called "Host Based Intrusion Detection Systems, or Intrusion Prevention Systems. Typical IDS systems are distributed, for example, by Entercept Inc. and WebCohort Inc. An IDS generally has an attributes file containing a list of invalid "signatures". The IDS detects hackers by continuously monitoring the network, or more particularly the communications between the users and the application, and if such invalid signature is detected, the system terminates the session or denies access. As previously said, such approach is known in the art as a "negative approach", as the list of attributes contains only invalid attributes ("signatures" in this case). A typical IDS operating in the negative approach suffers from the drawback of the need to first face (or to be notified of) a harmful situation (with all the consequences involved), in order (for the system manager) to be capable of introducing a suitable attribute that defines such a situation as invalid.

Therefore, understanding the limitations of using signatures based security systems operating at the negative approach, IDS vendors are now moving towards a new security model operating at the positive approach, where the security system learns "the normal behavior of the application" by profiling the HTTP or SQL communication (or any other application protocol). In that case, events that deviate from the "normal" application behavior ("irregular events" are generally further assessed or evaluated by the system until a decision is made). This new approach has found to be very problematic, as it requires a significant learning and assessment effort, that can not always provide solutions in real time.

As will be shown by this example, the system of the present invention overcomes said drawbacks.

According to the following embodiment of the present example, in FIG. 1, the Network Security Package 6 is an IDS, and the Attributes file 7 contains the signatures of the IDS.

More particularly, referring to FIG. 2, the IDS is the Network Security Package 6, and the signatures are contained within the attributes file 7. The security controlling unit 10 transforms the attributes file 10 into the common format, it also picks up other attributes from various network (or other) trusted sources (such as security scanners), all the attributes are transformed into the common format, and a consolidated file is produced following the process as described before. The consolidated file is then transformed into the specific format of the original attributes file (of the network Security Package) and it replaces the original attributes (signatures) file. In this manner the attributes file containing signatures is continuously updated with data as received from trusted sources, such as scanners, resulting with the IDS continuously updated, holding the signatures (Negative approach) and the additional updated attributes received from other trusted sources (Positive approach), and therefore providing less false positive and/or negative alerts.

EXAMPLE 4

An application switch is a unit well known in the art. An important task of an application switch is the direction of incoming traffic to a specific target server, using a predefined set of attributes. More particularly, the direction is made by comparison of one or more application level attributes included in the request, with the application attributes within the set (this is similar to network switches that do the same, however, they operate on network level attributes).

An example for the use of an application switch is as follows:

A Web application has a single HTML page called Login.html, and two image files x.gif and y.gif.

The Web application has been deployed using two web servers, a first, HTML files server, holding the said Login.html file and a second, Image files server, holding the said two image files.

An application level switch is used in front of the said two web servers, and is configured to switch all requests for images to the Images server and all requests for HTML files to the HTML files server.

Now, for example, if a remote user sends a request to the Web application, requesting the x.gif file:

The request arrives the application level switch, that extracts the application attributes from the user request, in this case x.gif, and switches the request to the Image files server, as its final destination. Note that a valid request includes both network and application attributes.

The above application switch performs said task using an attributes switching table containing predefined application levels attributes.

Any remote user request with application attributes that do not match a corresponding attribute within the switching table (HTML/Images) will be rejected and switched, for example, to a pre-defined default location (or to another server) for handling the unidentified request.

The typical application switch according to the prior art, performs only switching operations per se, and it lacks any security capabilities. According to the present invention, said application switch can be modified to perform security tasks. In this respect, the attributes table of the application switch is used in a same manner as the attributes files 3 or 7 of FIG. 3 are used. Then, the Security Correction Unit 10 imports the attributes from said table of the application switch (the switch is treated here as a security package), and carry out the procedure of the invention, as described for example in FIG. 3. Then, the consolidated file, as produced by this procedure (and of course after the performing of the required format transforms), and containing security attributes collected from a plurality of trusted sources (or security packages), is exported back to the attributes table of the application switch.

In such a manner, the updated attributes within the table of the switch, if referred to according to the positive approach, now can perform security capabilities. More particularly, requests having application attributes that do not match any of the application attributes contained within the said updated table of the application switch are rejected. Only requests, however, that contain one or more application attributes that match attribute/s within said updated table are directed. In this manner, the application switch is provided with a security functionality (in the positive approach) in addition to its natural switching capabilities.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A method for the automatic update of a security policy enforced by at least one security package within a computerized system, comprising the steps of:
   a. Providing within the computerized system at least one trusted source, each capable of issuing a security report detailing at least one of: network protocol and its related attributes, application protocol and its related attributes application paths, application action, application action attributes, and application action flow, or security flaws within the computerized system;
   b. Periodically operating each of said at least one trusted source in order to issue a respective security report;
   c. Importing each respective security report into a security correcting unit, and forming one consolidated file comprising the details from each respective security report;
   d. Importing into said security correcting unit one or more attributes files of said at least one security package;
   e. Separately comparing the content of said consolidated file with the content of each of the imported attributes files, and updating each attributes file with security information included within said consolidated file;
   f. Separately exporting said updated attributes files and effecting each of them as the active attributes file or files of the corresponding security package;
   g. Using a predefined set of logical rules to decide which content from said consolidated file to effect and which to ignore; and
   h. Importing into said security correcting unit a second type report comprising application locations and paths that are defined by said security correcting unit as the only valid locations and paths for accessing an application, and said security correcting unit updating one or more relevant attribute files using the content of said second type report, thereby effecting an updated security policy.

2. A method according to claim 1, wherein:
   a. The step of importing each respective security source report further comprises the step of transforming each respective security report into a common format, and forming said consolidated file in said common format;
   b. The step of importing into said security correcting unit one or more attributes files of said at least one security package further comprises the step of transforming each attributes file into said common format; and
   c. The step of separately exporting each of said updated attributes files and effecting the same as the active attributes file or files of the corresponding security package further comprises the step of transforming said attributes file from a common format into a package specific format, prior to said exporting.

3. A method according to claim 1, wherein each respective security report comprises at least one attribute component.

4. A method according to claim 2 wherein each respective security report is arranged in the corresponding trusted source specific format.

5. A method according to claim 2 wherein each of said attributes files is arranged in the corresponding security package specific format.

6. A method according to claim 1, wherein each security package effects a security policy within its predefined range of responsibility, according to the content of its attributes file.

7. A method according to claim 1, wherein one of said at least one trusted source comprises a security scanner.

8. A method according to claim 3, wherein said attribute component is intended to eliminate a known flaw.

9. A method according to claim 3, wherein said attribute component is related to the current structure of the system, which when recorded within an updated attributes file enforces a security policy bounded to said structure, thereby rejecting activity deviated from said structure.

10. A computerized system for the automatic update of a security policy, the computerized system comprising one or more computers collectively comprising the following components:
   a. At least one security package enforcing a security policy within a predefined range of responsibility, said policy being defined by a specific, attributes file associated with each of said at least one security package;
   b. At least one trusted source capable of issuing a security report detailing at least one of: network protocol and its related attributes, application protocol and its related attributes, application paths, application action, application action attributes, and application action flow or security flaws within the system;
   c. A security correcting unit for:
      importing said report from each of said at least one trusted source, and producing a consolidated file including information from each said report;
      importing a second type report comprising application locations and paths that are defined by said security correcting unit as the only valid locations and paths for accessing an application, and updating one or more relevant attribute files using the content of said second type report, and
      importing the attributes file from each of said at least one security package, separately comparing the content of said consolidated file with each of the imported attributes files, and updating each attributes file with security information included within said consolidated file, using a predefined set of logical rules to decide which content from said consolidated file to effect and which to ignore, and exporting said updated attributes files and effecting each of them as the active attributes file of the corresponding security package, thereby effecting an updated security policy.

11. A system according to claim 10 wherein the security correcting unit further comprises:
   At least one first importing modules for importing reports from each of said at least one trusted source;
   A consolidation module for receiving each of said reports and forming one consolidated file containing information included in said reports;
   At least one second importing modules for importing into the correcting unit from each security package its corresponding attributes file;
   A security policy creation module comprising a set of predefined logical decision rules for use while updating the attributes files, for comparing the content of said consolidated file with each of the imported attributes files, and updating each attributes file with the security information included within said consolidated file, information which is missing from the said attributes file, and is relevant to said attributes file; and
   At least one exporting module for exporting each updated attributes file into its corresponding security package, thereby effecting an updated security policy.

12. A system according to claim 11, further comprising at least one first transform modules for transforming each report from its trusted source specific format into a common format, at least one second transform modules for transforming each imported attributes security package from its package specific format into a common format, and at least one third transform modules for transforming each updated attributes file from a common format into its package specific format before its exportation into the corresponding package, and wherein the consolidated file is also arranged in said common format.

13. System according to claim 10, wherein one of the security packages comprises an Intrusion Detection System, whose set of signatures is stored within a file, said file being treated as the attributes file of a security package, and is therefore updated accordingly.

14. System according to claim 10, wherein one of the security packages comprises an application switch, whose set of attributes that is used for direction being stored within a file, said file being treated by the system as an attributes file of a security package, and is therefore updated accordingly.

15. System according to claim 10, wherein one of the security packages comprises an Application Layer Firewall, whose set of attributes that is used for denying actions or accesses within the application or allowing legal actions or accesses within the application is stored within a file, said file being treated by the system as an attributes file of a security package, and is therefore updated accordingly.

* * * * *